US012034212B2

(12) United States Patent
Khripkov et al.

(10) Patent No.: US 12,034,212 B2
(45) Date of Patent: Jul. 9, 2024

(54) DUAL-POLARIZATION ANTENNA MODULE AND ELECTRONIC DEVICE COMPRISING SAID ANTENNA MODULE

(71) Applicant: Huawei Technologies Co., Ltd., Shenzhen (CN)

(72) Inventors: Alexander Khripkov, Helsinki (FI); Janne Ilvonen, Helsinki (FI); Jari Kristian Van Wonterghem, Helsinki (FI); Timofey Kamyshev, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 153 days.

(21) Appl. No.: 17/773,187

(22) PCT Filed: Nov. 6, 2019

(86) PCT No.: PCT/EP2019/080381

§ 371 (c)(1),
(2) Date: Apr. 29, 2022

(87) PCT Pub. No.: WO2021/089137

PCT Pub. Date: May 14, 2021

(65) Prior Publication Data

US 2022/0376401 A1 Nov. 24, 2022

(51) Int. Cl.
*H01Q 15/24* (2006.01)
*H01Q 1/22* (2006.01)
(Continued)

(52) U.S. Cl.
CPC ........... *H01Q 15/24* (2013.01); *H01Q 1/2266* (2013.01); *H01Q 1/243* (2013.01); *H01Q 1/273* (2013.01)

(58) Field of Classification Search
CPC ...... H01Q 1/2266; H01Q 1/243; H01Q 1/273; H01Q 15/14
See application file for complete search history.

(56) References Cited

U.S. PATENT DOCUMENTS 9,871,299 B2 1/2018 Ganchrow et al.
9,905,922 B2 2/2018 Lee et al.
(Continued)

FOREIGN PATENT DOCUMENTS

CN 105552569 A 5/2016
CN 207517868 A 6/2018
(Continued)

OTHER PUBLICATIONS

Rodriguez-Cano, et al., "Reduction of Main Beam-Blockage in an Integrated 5G Array With a Metal-Frame Antenna," in IEEE Transactions on Antennas and Propagation, vol. 67, No. 5, May 2019, 10 pages.

*Primary Examiner* — Hoang V Nguyen
(74) *Attorney, Agent, or Firm* — Conley Rose, P.C.

(57) ABSTRACT

An electronic device and antenna system for generation of millimeter-wave frequency radiation. The antenna system has first conductive structure, a second conductive structure, and an antenna comprising a first antenna element configured to excite a first electric field having a first polarization, and a second antenna element configured to excite a second electric field having a second polarization. The first antenna element and the second antenna element extend in an antenna plane. An anisotropic dielectric volume is partially enclosed by the antenna, the first conductive structure, and the second conductive structure. A first surface of the dielectric volume is open to the exterior of the antenna system. The dielectric volume allows the first and second electric fields to propagate, within the dielectric volume, from the antenna at least partially towards the first conductive structure, and to radiate from the first surface to the exterior.

20 Claims, 7 Drawing Sheets

(51) Int. Cl.
*H01Q 1/24* (2006.01)
*H01Q 1/27* (2006.01)

(56) References Cited

U.S. PATENT DOCUMENTS

| | | | | |
|---|---|---|---|---|
| 2013/0265202 | A1* | 10/2013 | Soora | H01Q 1/243 343/700 MS |
| 2016/0036132 | A1* | 2/2016 | Rumpf | H01Q 1/526 343/909 |
| 2016/0118713 | A1 | 4/2016 | Hong et al. | |
| 2017/0069958 | A1 | 3/2017 | Ko et al. | |
| 2017/0201011 | A1 | 7/2017 | Khripkov et al. | |
| 2017/0294705 | A1 | 10/2017 | Khripkov et al. | |
| 2018/0090816 | A1 | 3/2018 | Mow et al. | |
| 2018/0191059 | A1 | 7/2018 | Ko et al. | |
| 2018/0191081 | A1 | 7/2018 | Lukyanov et al. | |
| 2019/0103682 | A1 | 4/2019 | Thai et al. | |
| 2019/0109387 | A1 | 4/2019 | Samadi Taheri et al. | |
| 2020/0314223 | A1 | 10/2020 | Khripkov | |

FOREIGN PATENT DOCUMENTS

| | | | |
|---|---|---|---|
| CN | 109560387 | A | 4/2019 |
| CN | 109888484 | A | 6/2019 |
| CN | 111279548 | A | 6/2020 |
| WO | 2019120515 | A1 | 6/2019 |

* cited by examiner

DUAL-POLARIZATION ANTENNA MODULE AND ELECTRONIC DEVICE COMPRISING SAID ANTENNA MODULE

CROSS-REFERENCE TO RELATED APPLICATIONS

This is a U.S. National Stage of International Patent Application No. PCT/EP2019/080381, filed on Nov. 6, 2019, which is hereby incorporated by reference in its entirety.

TECHNICAL FIELD

The disclosure relates to a dual-polarization antenna module for generation of millimeter-wave frequency radiation, the antenna module comprising an antenna (2), comprising a plurality of antenna elements, and a plurality of conductive structures.

BACKGROUND

Electronic devices need to support more and more radio signal technology such as 2G/3G/4G radio. For coming 5G radio technology, the frequency bands will be expanded to cover not only sub-6 GHz frequencies but also millimeter-wave frequencies, e.g. 42 GHZ, thus requiring the addition of a number of new wide-band antennas in addition to the existing antennas.

Conventionally, the antennas of an electronic device are arranged next to the display, such that the display does not interfere with the efficiency and frequency bandwidth of the antenna. However, the movement towards very large displays, covering as much as possible of the electronic device, makes the space available for the antennas very limited, forcing either the size of the antennas to be significantly reduced, and its performance impaired, or a large part of the display to be inactive.

Furthermore, the radiation beam from a millimeter-wave antenna module is oftentimes restricted and/or distorted by conductive sections of the surrounding housing. Radiation from broadside millimeter-wave antennas is affected by the display, while radiation from end-fire millimeter-wave antennas is affected by the conductive side frame. This, in turn, affects the desired omnicoverage necessary for mobile electronic devices such as smartphones.

SUMMARY

It is an object to provide an improved antenna module. The foregoing and other objects are achieved by the features of the independent claims. Further implementation forms are apparent from the dependent claims, the description, and the figures.

According to a first aspect, there is provided a dual-polarization antenna module for generation of millimeter-wave frequency radiation, the antenna module comprising an antenna comprising at least one first antenna element configured to excite a first electric field having a first polarization, and at least one second antenna element configured to excite a second electric field having a second polarization, the first antenna element and the second antenna element extending in an antenna plane, a first conductive structure and a second conductive structure, an anisotropic dielectric volume partially enclosed by the antenna, the first conductive structure, and the second conductive structure, a first surface of the dielectric volume being open to an exterior of the antenna module, the dielectric volume allowing the first electric field and the second electric field to propagate, within the dielectric volume, from the antenna at least partially towards the first conductive structure, and radiate from the first surface to the exterior.

Such an antenna module is very flexible and can be easily integrated into any mobile electronic device or any other device with similar space requirements, while still having a wide band dual-polarization beamforming covering necessary 5G frequency bands. The antenna module can be formed with the help of other, existing components, since its antenna elements work even at very small distances from the reference ground of the device. The dielectric volume facilitates a dual-polarization millimeter-wave frequency radiation antenna as well as yet another sub-6 GHz antenna.

In a possible implementation form of the first aspect, the dielectric volume further comprises a plurality of ground strips, the plurality of ground strips are aligned with the antenna plane and divide the dielectric volume into a first dielectric volume and a second dielectric volume, the first dielectric volume extending between the first surface of the dielectric volume and the ground strips, the second dielectric volume extending between the ground strips and the second conductive structure. The ground strips 9 define the anisotropic parameters of the dielectric volume 7, which enables different effective material parameters for the first electric field having a first polarization and the second electric field having a second polarization, therefore enabling dual-polarization beamforming at presence of conductive sections of the surrounding housing.

In a further possible implementation form of the first aspect, the first antenna element and the second antenna element are end-fire antenna elements, and the dielectric volume extends between the antenna and the first conductive structure in a radiation direction of the end-fire antenna elements, the radiation direction being aligned with the antenna plane. This allows the dielectric volume, and hence the effective volume of the antenna to be as large as possible, which improves the bandwidth and gain of the end-fire antennas.

In a further possible implementation form of the first aspect, the first dielectric volume has a different shape than the second dielectric volume in a direction perpendicular to the antenna plane, allowing the antenna module to be adapted to other existing components of the electronic device into which the antenna module is to be fitted. In some embodiments, yet another sub-6 GHz antenna is arranged by the first and the second conductive structure and the dielectric volume.

In a further possible implementation form of the first aspect, a height of the dielectric volume h in the direction perpendicular to the antenna plane, gradually decreases in a direction from the antenna to the first conductive structure, the first electric field and the second electric field being confined to the dielectric volume if $h>\lambda/2\sqrt{\varepsilon_r}$, λ being a wavelength of the first electric field and the second electric field, εr being an effective relative dielectric constant of the dielectric volume, and the first electric field and the second electric field being radiated into a space adjacent the dielectric volume and the first conductive structure when $h\leq\lambda/4\sqrt{\varepsilon_r}$. By retaining the energy of the electric fields inside the dielectric volume, efficiency is improved and diffraction at the antenna edge is reduced. Further, the tapered profile of the dielectric volume provides wave impedance matching between the antenna and the exterior.

In a further possible implementation form of the first aspect, center lines of the antenna elements are aligned with an edge of the first conductive structure. Hence, radiation direction blockage by the first conductive structure is minimized. This allows the height of the dielectric volume h to be maximized since the antenna elements are as high as possible relative to the first conductive structure and the second conductive structure. Thus, antenna efficiency is improved by coupling the first and the second electric fields to the dielectric volume, while reducing diffraction at the antenna edge.

In a further possible implementation form of the first aspect, the ground strips are shaped as a conductive pattern, the conductive pattern extending from the antenna towards the first conductive structure. The conductive pattern of the ground strips within the dielectric volume are configured as an anisotropic dielectric waveguide for the first and the second electric fields. Thus, the antenna is coupled with the first conductive structure and free-space, efficiently radiating towards the end-fire direction being aligned with the antenna plane.

In a further possible implementation form of the first aspect, the conductive pattern comprises at least two lines, tracks, and traces separated by capacitive gaps. Hence, galvanic connection between the conductive pattern of the ground strips and the first conductive structure is avoided. Further, mutual capacitance between the antenna ground, i.e. the second conductive structure, and the first conductive structure is reduced. At that, said dielectric volume partially enclosed by the antenna, the first conductive structure, and the second conductive structure is configured as yet another antenna, operating at another sub-6 GHz frequency band.

In a further possible implementation form of the first aspect, the first electric field has a horizontal polarization and the second electrical field has a vertical polarization, the first electric field extending perpendicular to a conductive surface of the ground strips, allowing the first antenna element to utilize the first dielectric volume and the second dielectric volume, the second electric field extending parallel with the conductive surface of the ground strips, exciting currents on the conductive surface and allowing the second antenna element to utilize the first dielectric volume only. By utilizing the entire dielectric volume 7, hence the efficiency and gain of the horizontal polarization is maximized. By isolating the second electric field from the second dielectric volume the efficiency and gain of the vertical polarization is maximized.

In a further possible implementation form of the first aspect, the conductive pattern comprises at least one of lines, tracks, and traces aligned in the antenna plane. The topology of the conductive pattern of the ground strips is configured for impedance matching between the antenna elements and the exterior, which improves the bandwidth and gain of the dual-polarization end-fire antennas. Currents induced by the first antenna element on the conductive pattern are minimized by reduced length of the lines in directions parallel to the antenna edge, thus the dielectric volume under the conductive pattern of the ground strips is effectively utilized as a part of the waveguide for the first electric fields. Currents induced by the second antenna element on the conductive pattern are maximized by increasing length of the lines in directions perpendicular to the antenna edge, thus dielectric volume under the conductive pattern of the ground strips is effectively isolated from the waveguide for the second electric fields.

In a further possible implementation form of the first aspect, the dielectric volume further comprises a plurality of conductors coupling the dielectric volume to the antenna, the conductors extending at least partially in parallel with the antenna plane and with the radiation direction. The topology of the conductors is configured for coupling the second antenna electric fields to the dielectric volume, reducing the diffraction at the antenna module edge. Thus, the bandwidth and gain of the second end-fire antennas is improved.

In a further possible implementation form of the first aspect, the dielectric volume further comprises a plurality of conductors coupling the dielectric volume to the antenna, the conductors extending in parallel with the antenna plane and perpendicular to the radiation direction. The topology of the conductors is configured for coupling the first antenna electric fields to the dielectric volume, reducing diffraction at the antenna module edge and improving the bandwidth and gain of the first end-fire antennas.

According to a second aspect, there is provided an electronic device comprising a display, a back cover, a frame extending between the display and the back cover, and at least one antenna module according to the above, the frame comprises the first conductive structure of the antenna module, the display comprises the second conductive structure of the antenna module, a gap extends between the antenna elements of the antenna module, the frame and the display, accommodating at least the dielectric volume of the antenna module, the antenna module being arranged adjacent the back cover such that the first surface of the dielectric volume extends adjacent the back cover, the conductors being located between the first surface and the back cover. The electronic device may have a large display, while still having a wide band covering necessary 5G frequency bands. The antenna module provides the needed resonance frequencies for wide-band operation.

In a possible implementation form of the second aspect, the electronic device further comprises at least one discontinuity formed between the back cover and the frame, between the conductors, and along the first surface of the dielectric volume, the discontinuity allowing the first electric field and the second electric field to radiate from the antenna module to an exterior of the antenna module.

In a further possible implementation form of the second aspect, the electronic device further comprises at least one substrate carrying at least one of the antenna elements and the ground strips. As the antenna module is formed partially using other existing components, the antenna module is not only spatially efficient but can be arranged in juxtaposition with the display, i.e. on-ground.

In a further possible implementation form of the second aspect, the substrate is a printed circuit board. This allows a large part of the antenna module to be made into one integral piece, which significantly facilitates the assembly of the electronic device.

In a further possible implementation form of the second aspect, a height of the dielectric volume is measured between the back cover and the display, allowing the dielectric volume, and hence the effective volume of the antenna to be as large as possible, which improves the bandwidth and gain of the end-fire antennas. Furthermore, this facilitates provision of a further antenna in the same space.

In a further possible implementation form of the second aspect, the substrate extends at least partially in parallel with the display.

In a further possible implementation form of the second aspect, the electronic device comprises a further antenna module at least partially located in the gap, improving the bandwidth of the electronic device.

In a further possible implementation form of the second aspect, the further antenna module comprises a sub-6 GHz antenna.

This and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figure 3:
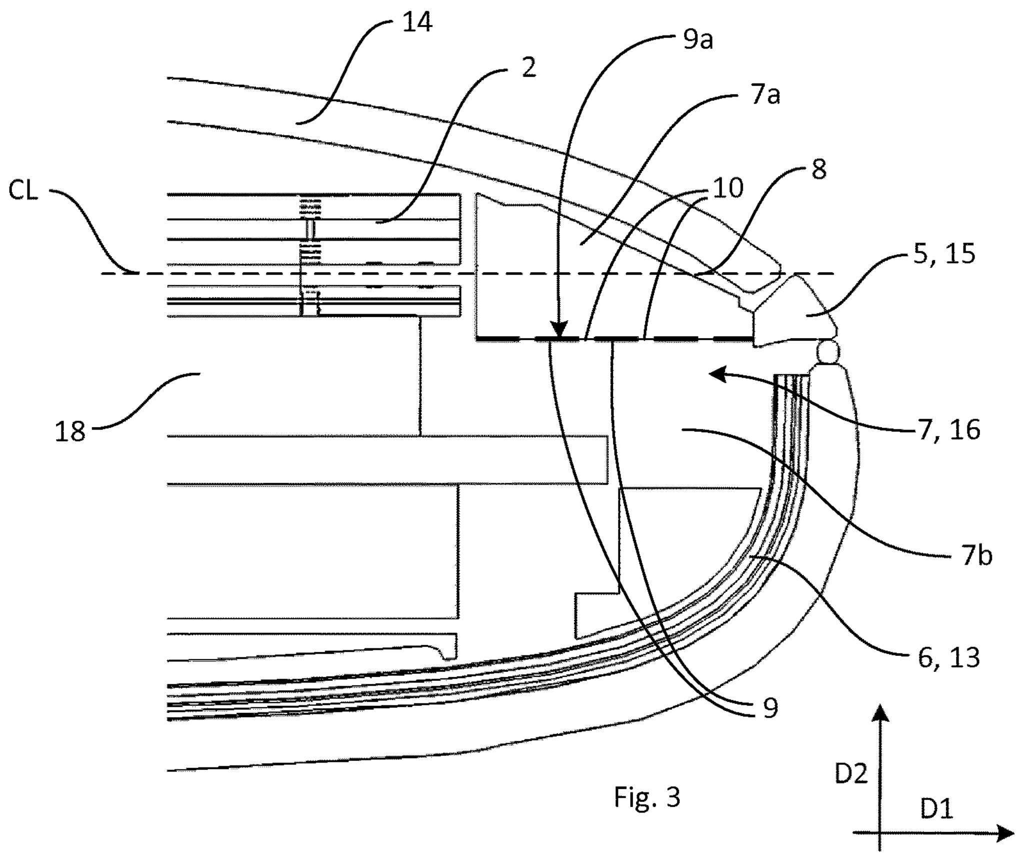
FIG. 3 shows a cross-sectional view of an antenna module in accordance with one embodiment of the present invention.
Figure 4:
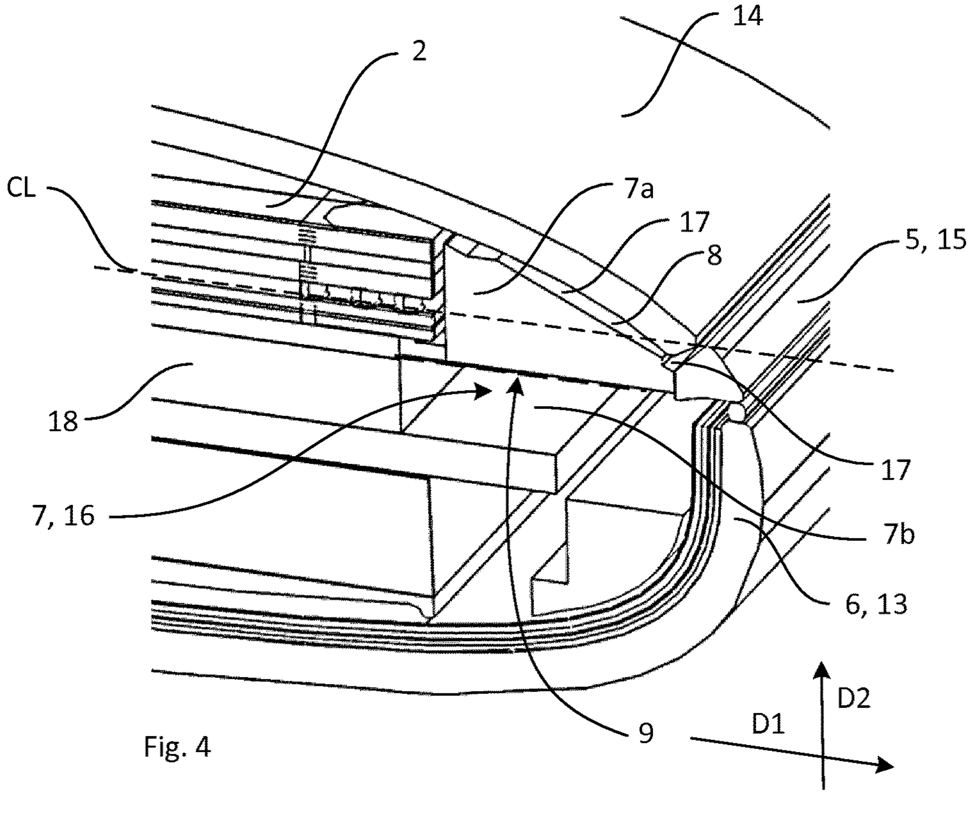
FIG. 4 shows a partial perspective view of an antenna module in accordance with one embodiment of the present invention.

FIGS. 3 and 4 show an embodiment of a dual-polarization antenna module 1 for generation of millimeter-wave frequency radiation. The antenna module 1 comprises an antenna 2, a first conductive structure 5, and a second conductive structure 6. An anisotropic dielectric volume 7 is partially enclosed by the antenna 2, the first conductive structure 5, and the second conductive structure 6.

Figure 5:
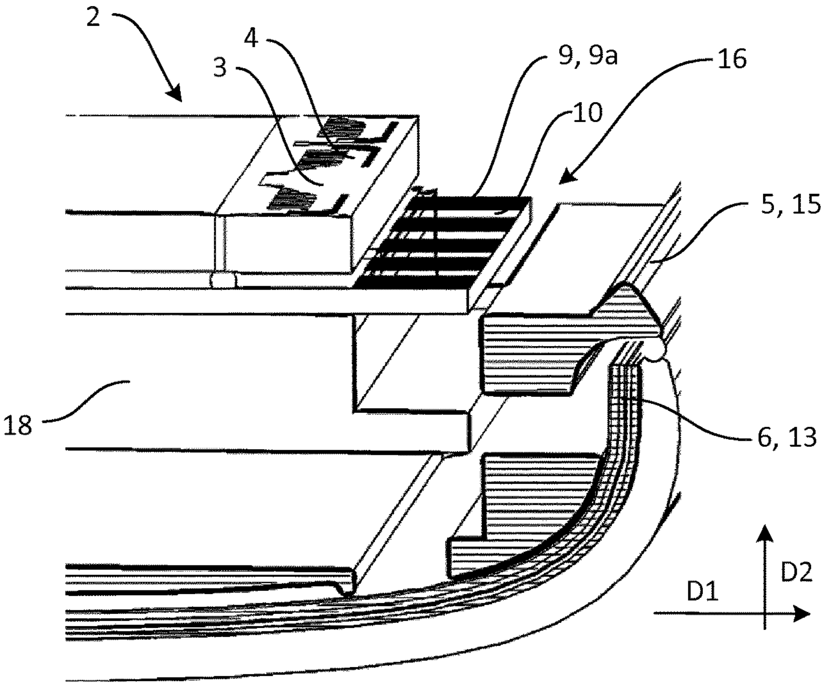
FIG. 5 shows a partial perspective view of an antenna module in accordance with one embodiment of the present invention.
Figure 10:
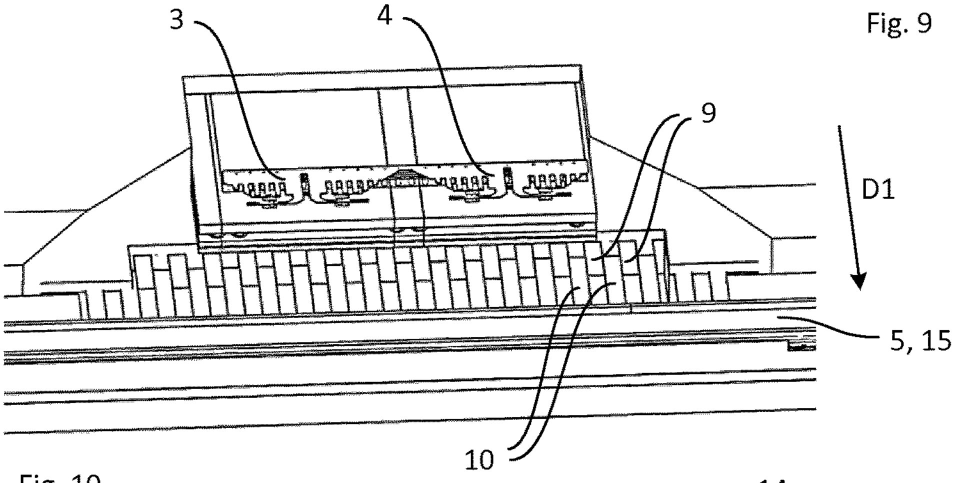

As shown in FIGS. 5 and 10, the antenna 2 comprises at least one first antenna element 3 and at least one second antenna element 4 which extend in an antenna plane. The first antenna element 3 is configured to excite a first electric field F1 having a first polarization. The second antenna element 4 is configured to excite a second electric field F2 having a second polarization.

The first antenna element 3 and the second antenna element 4 may be end-fire antenna elements, in which case the dielectric volume 7 extends between the antenna 2 and the first conductive structure 5 in a radiation direction D1 of the end-fire antenna elements 3, 4, the radiation direction D1 being aligned with the antenna plane. The end-fire antenna elements generate dual-polarization electric fields F1, F2 at the edge coupled to the dielectric volume 7. At that edge, the dual-polarization electric fields F1, F2 are bound within the dielectric volume 7.

A first surface 8 of the dielectric volume 7 is open to an exterior of the antenna module 1, i.e. to the exterior of the electronic device 12 in which the antenna module 1 is arranged. The first surface 8 is preferably arranged such that it extends adjacent the back cover 14. The dielectric volume 7 allows the first electric field F1 and the second electric field F2 to propagate within the dielectric volume 7, from the antenna 2 at least partially towards the first conductive structure 5, and to subsequently radiate from the first surface 8 to the exterior at an edge opposite the end-fire antenna elements.

Figure 1:
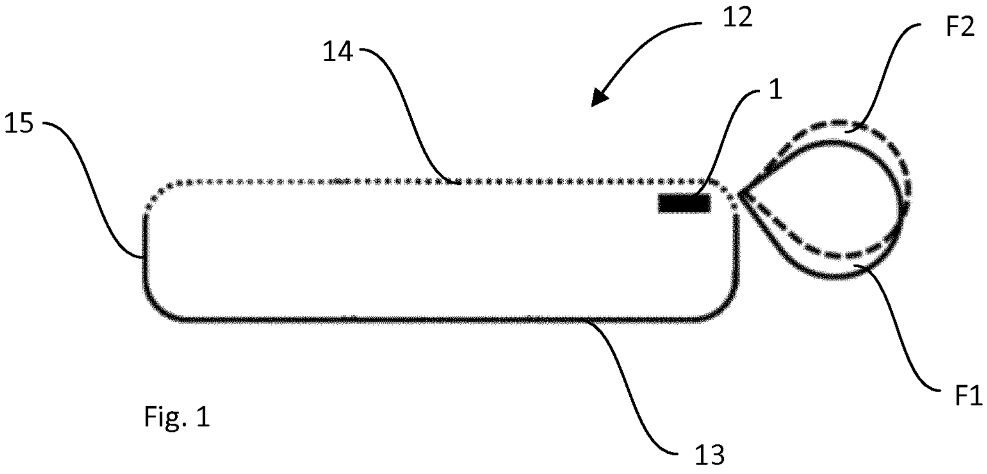
FIG. 1 shows a schematic side view of an electronic device in accordance with one embodiment of the present invention.
Figure 2:
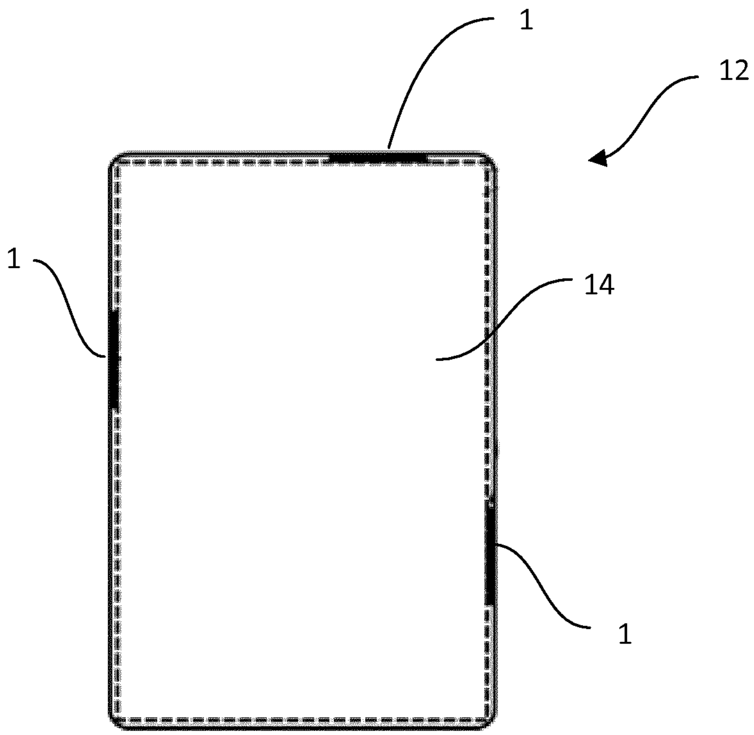
FIG. 2 shows a schematic top view of an electronic device in accordance with one embodiment of the present invention.

The electronic device 12, shown schematically in FIGS. 1 and 2, comprises a display 13, a back cover 14, a frame 15 extending between the display 13 and the back cover 14, and at least one antenna module 1. The frame 15 comprises the first conductive structure 5. Preferably, the frame 15 is solid and does not comprise any throughgoing openings, which openings would weaken the frame and make it less durable. Such openings are conventionally filled with dielectric material and placed adjacent antenna elements in order to allow radiation to radiate through the openings and into the exterior of the electronic device. The dielectric volume 7 forms a travelling wave structure. The antenna module 1 is arranged adjacent the back cover 14, and parallel with the frame 15. The back cover 14 may be made of non-conductive material such as plastic, glass, or ceramic, and is preferably partially curved.

Center lines CL of the antenna elements 3, 4 may be aligned with an edge of the first conductive structure 5, i.e. the edge of frame 15 facing a corresponding edge of the back cover 14, as indicated by FIGS. 3 and 4.

The display 13 comprises the second conductive structure 6. In one embodiment, the display 13 cover the entire front surface of the electronic device 12. The display 13 is preferably partially curved, e.g. between 90 and 135° from the main plane of the display 13.

A gap 16 extends between the antenna elements 3, 4, the frame 15 and the display 13, accommodating at least the dielectric volume 7, i.e. the antenna elements 3, 4, the frame 15 and the display 13 form the boundaries of the dielectric volume 7. The gap 16 is filled with dielectric material, forming the dielectric volume 7, and increases the effective volume of the antenna.

At least one discontinuity 17 may be formed between the back cover 14 and the frame 15, between the conductors 11, and along the first surface 8 of the dielectric volume 7. The discontinuity 17 allows the first electric field F1 and the second electric field F2 to radiate from the antenna module 1 to the exterior of the antenna module 1.

The dielectric volume 7 may comprise a plurality of ground strips 9, as shown most clearly in FIGS. 5, 9 to 11, 13, 14, and 16. The ground strips 9 may be shaped as a conductive pattern, the conductive pattern extending from the antenna 2 towards the first conductive structure 5. The conductive pattern may comprise at least one of lines, tracks, and traces aligned in the antenna plane. Furthermore, the conductive pattern may comprise at least two lines, tracks, and traces separated by capacitive gaps 10. The ground strips 9/conductive pattern are preferably aligned perpendicularly with the edges of the antenna 2 and frame 15.

The electronic device 12 may comprise at least one substrate 18 carrying at least one of the antenna elements 3, 4 and the ground strips 9. The substrate 18 may be one printed circuit board (PCB), or several stacked PCBs. In one embodiment, the substrate 18 extends at least partially in parallel with the display 13.

The antenna module 1 is arranged adjacent the back cover 14 such that a first surface 8 of the dielectric volume 7 extends adjacent the back cover 14.

Figure 7:
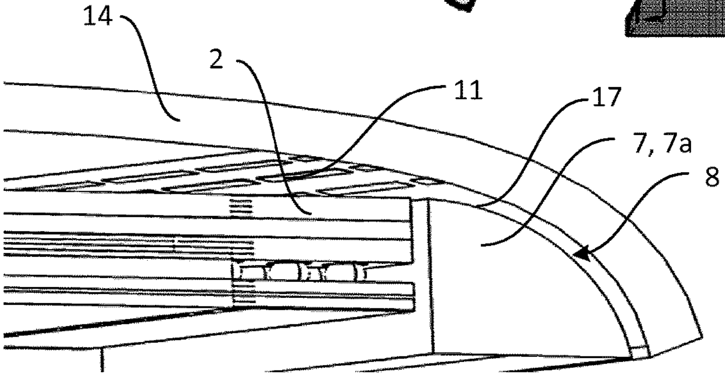
FIGS. 7 and 8 show partial perspective views of an antenna module in accordance with one embodiment of the present invention.
Figure 8:
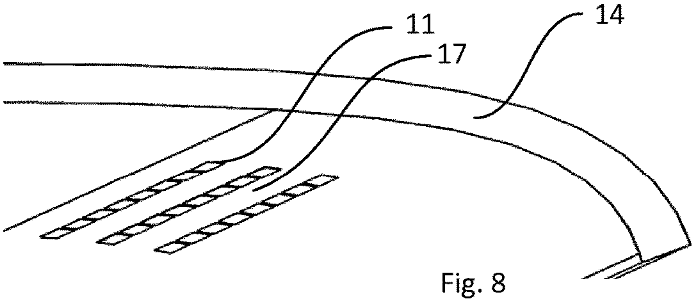
Figure 9:
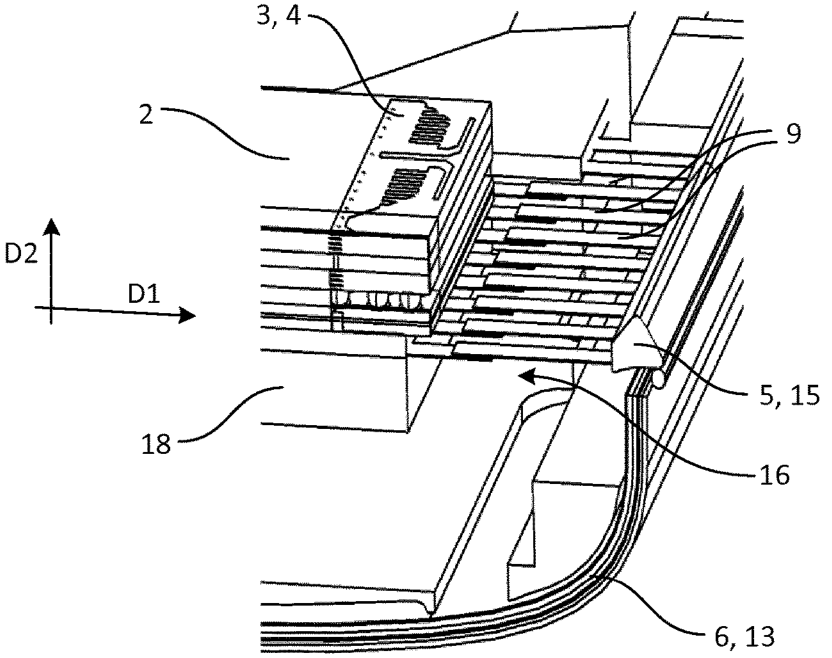
FIGS. 9 to 11 show partial perspective views of an antenna module in accordance with one embodiment of the present invention.
Figure 18A:
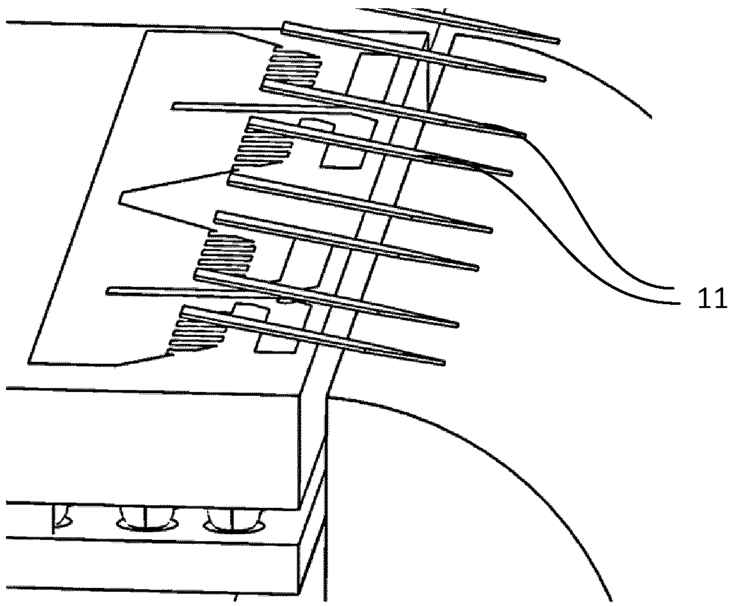
FIGS. 18*a* and 18*b* show partial perspective views of an antenna module in accordance with one embodiment of the present invention.
Figure 18B:
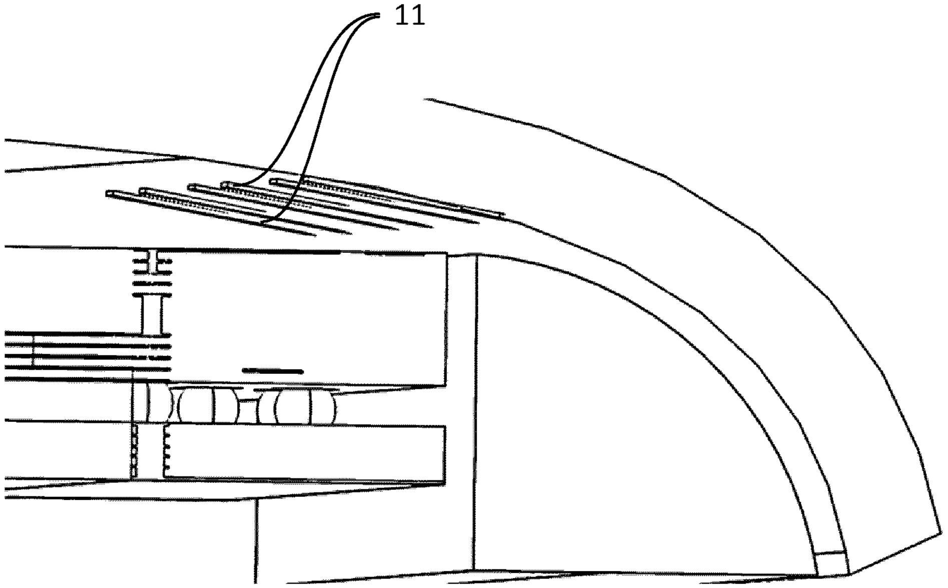

The dielectric volume 7 may further comprises a plurality of conductors 11 coupling the dielectric volume 7 to the antenna 2, more exactly to the first antenna element 3 and the second antenna element 4. The conductors 11 may be located between the first surface 8 and the back cover 14, as shown in FIGS. 7 and 8. In one embodiment, the conductors 11 extend at least partially in parallel with the antenna plane and with the radiation direction D1, as shown in FIGS. 18*a* and 18*b*. In a further embodiment, the conductors 11 extend in parallel with the antenna plane and perpendicular to the radiation direction D1, as shown in FIGS. 7 and 8.

The plurality of ground strips 9 are aligned with the antenna plane and divide the dielectric volume 7 into a first dielectric volume 7*a* and a second dielectric volume 7*b*. The first dielectric volume 7*a* extends between the first surface 8 of the dielectric volume 7 and the ground strips 9, and the second dielectric volume 7*b* extends between the ground strips 9 and the second conductive structure 6. The ground strips 9 define the anisotropic parameters of the dielectric volume 7, which enables having two different polarizations.

Figure 11:
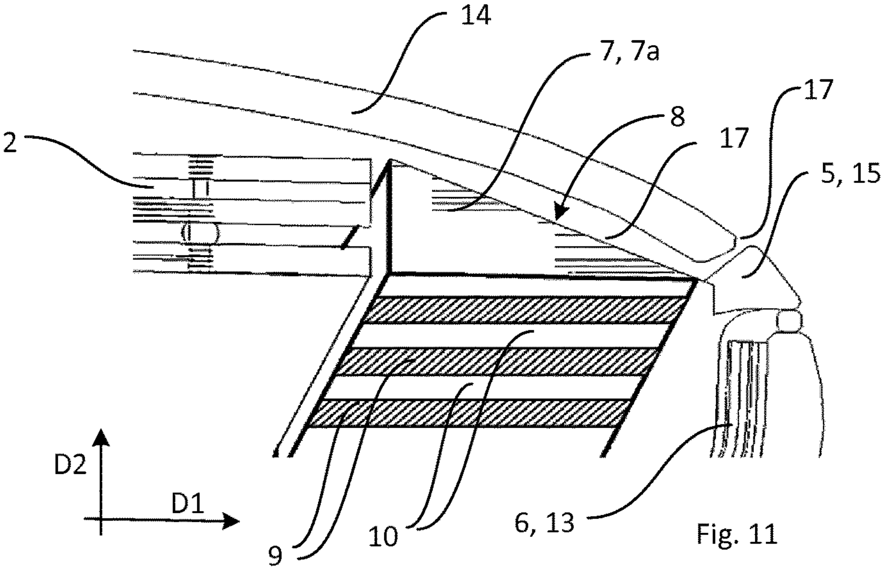
Figure 12:
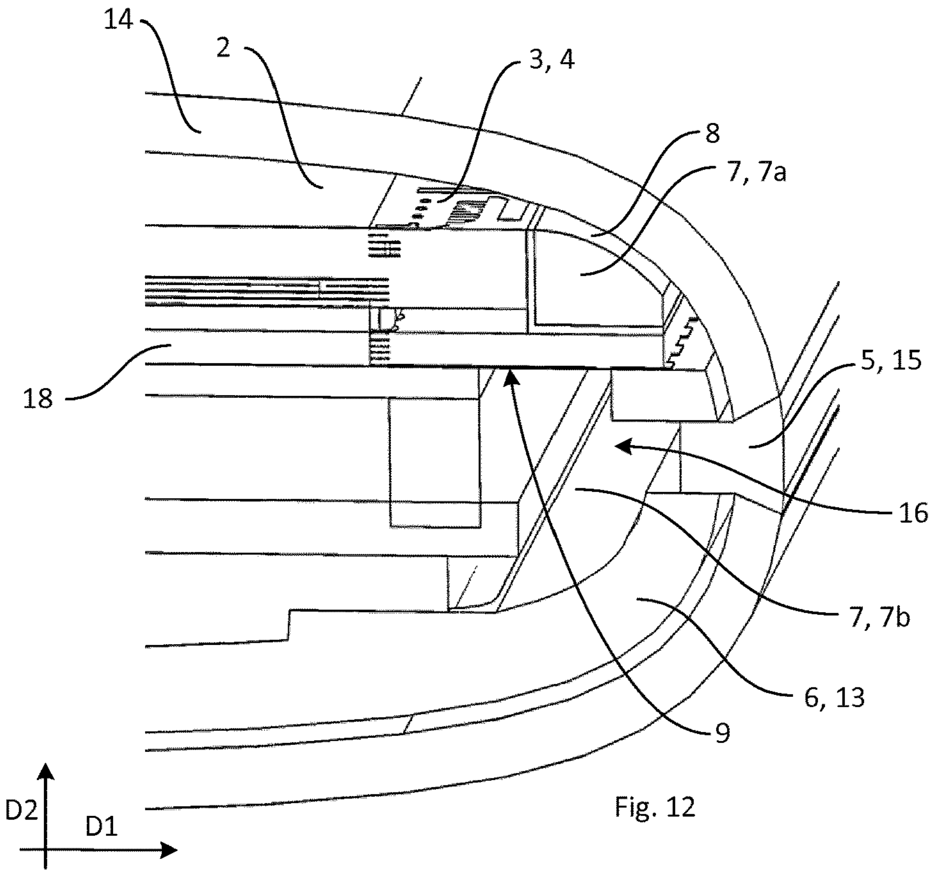
FIGS. 12 to 17 show partial perspective views of an antenna module in accordance with a further embodiment of the present invention.
Figure 13:
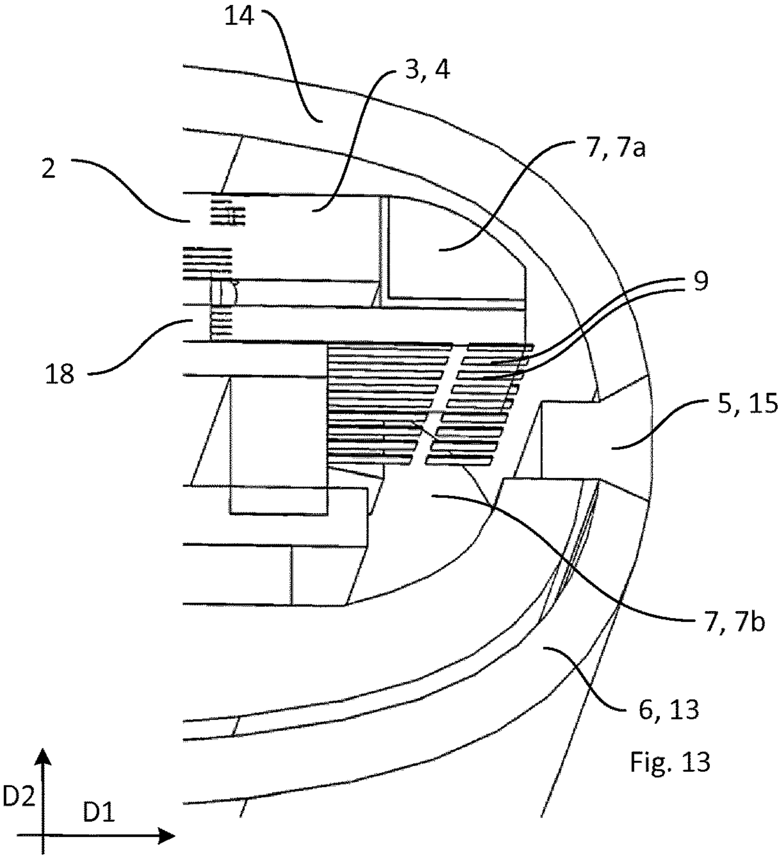
Figure 14:
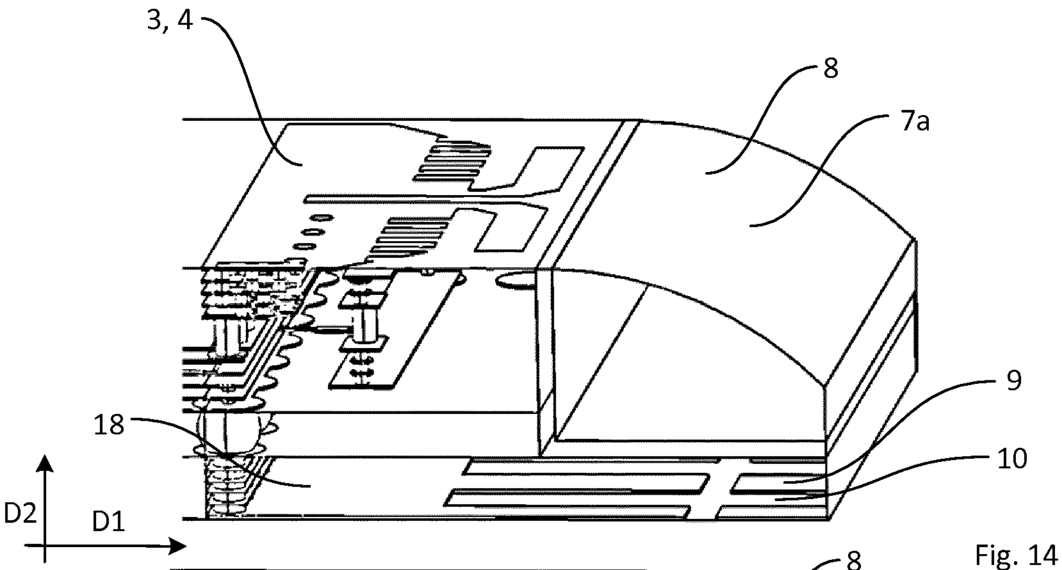
Figure 15:
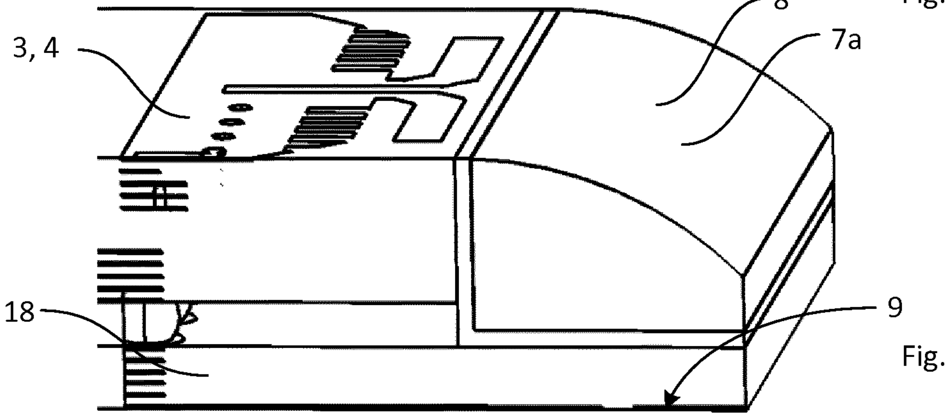
Figure 16:
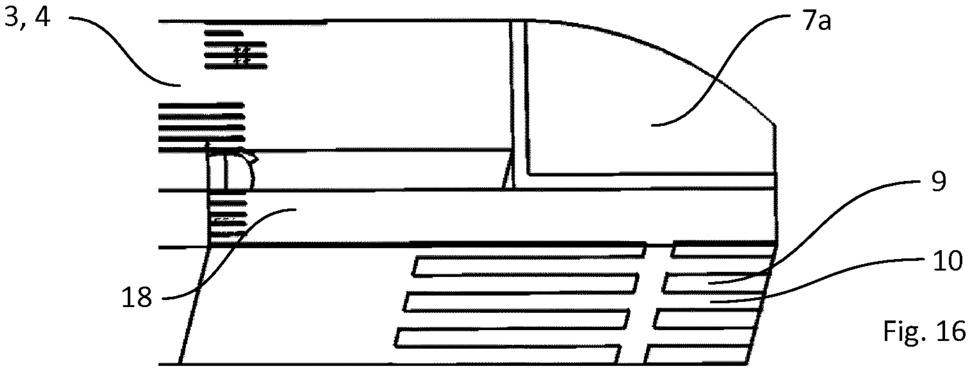
Figure 17:
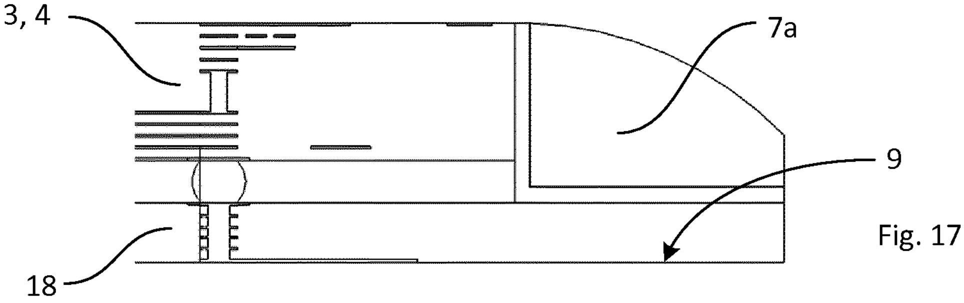

The ground strips 9 may be arranged on a surface of the first dielectric volume 7*a* which extends substantially opposite to the first surface 8, as shown in FIGS. 3, 4, and 11. The ground strips 9 may also be arranged on top of the substrate 18, should the substrate 18 extend underneath the first dielectric volume 7*a*, as shown in FIG. 5. The ground strips 9 may also be arranged on underneath the substrate 18, should the substrate 18 extend underneath the first dielectric volume 7*a*, as shown in FIGS. 12 to 17. This allows the antenna module 1 to be one integral piece.

The first dielectric volume 7*a* may have a different shape than the second dielectric volume 7*b* in a direction D2 perpendicular to the antenna plane and perpendicular to direction D1, such that the complete dielectric volume 7 is asymmetric.

In one embodiment, the first electric field F1 has a horizontal polarization and the second electrical field F2 has a vertical polarization. The first electric field F1 extends perpendicular to a conductive surface 9*a* of the ground strips 9, allowing the first antenna element 3 to utilize the first dielectric volume 7*a* and the second dielectric volume 7*b*, i.e. the entire dielectric volume 7, hence maximizing the efficiency and gain of the horizontal polarization. The second electric field F2 extends parallel with the conductive surface 9*a* of the ground strips 9, exciting currents on the conductive surface 9*a* and allowing the second antenna element 4 to utilize the first dielectric volume 7*a* only, isolating the electric field F2 from the second dielectric volume 7*b* and, hence, maximizing the efficiency and gain of the vertical polarization.

A height of the dielectric volume 7, in the direction D2 perpendicular to the antenna plane, may gradually decrease in a direction from the antenna 2 to the first conductive structure 5, giving the dielectric volume 7, and the first dielectric volume 7*a* in particular, a tapered shape. Preferably, the taper substantially follows the inner shape of the back cover 14. In one embodiment, the height of the dielectric volume 7 is measured between the back cover 14 and the display 13. As the dielectric volume 7, 7*a* tapers, the surface impedance changes continuously. The first electric field F1 and the second electric field F2 are confined to the dielectric volume 7 if height $h>\lambda/2\sqrt{\varepsilon_r}$, $\lambda$ being a wavelength of the first electric field F1 and the second electric field F2, and $\varepsilon_r$ being an effective relative dielectric constant of the dielectric volume 7. The first electric field F1 and the second electric field F2 are no longer confined, but instead radiated into a space adjacent the dielectric volume 7 and the first conductive structure 5, when height $h\leq\lambda/4\sqrt{\varepsilon_r}$, i.e. to the exterior of the electronic device 12 in which the antenna module 1 is arranged. In other words, the dielectric volume 7 retains and guides electric field F1 and electric field F2 towards the frame 15, i.e. the edge of the electronic device 12, which thereafter radiate from the surface of the frame 15 in predominantly end-fire directions. By retaining the energy of the electric fields inside the dielectric volume 7, efficiency is improved and diffraction at the antenna 2 edge is reduced. Further, the taper provides matching between the antenna 2 and the exterior.

Figure 6:
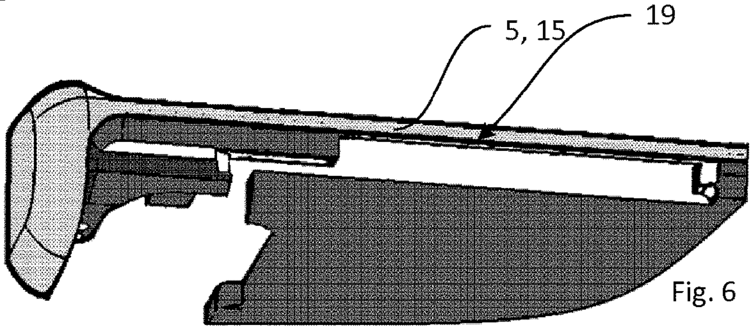
FIG. 6 shows a partial perspective view of an antenna module in accordance with one embodiment of the present invention.

The electronic device 12 may comprises a further antenna module 19 at least partially located in the gap 16, as indicated in FIG. 6. The further antenna module 19 may comprise a sub-6 GHz antenna, formed in part by the frame 15.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

What is claimed is:

1. An electronic device comprising:
a display;
a back cover;
a frame extending between the display and the back cover; and
an antenna system configured to generate millimeter-wave frequency radiation, wherein the antenna system comprises: an antenna, wherein the antenna comprises:
a first antenna element extending in an antenna plane and configured to excite a first electric field having a first polarization; and
a second antenna element extending in the antenna plane and configured to excite
a second electric field having a second polarization;
a first conductive structure integral with the frame;
a second conductive structure integral with the display; and
an anisotropic dielectric volume partially enclosed by the antenna, the first conductive structure, and the second conductive structure,
wherein a first surface of the anisotropic dielectric volume is open to an exterior of the antenna system, and
wherein the anisotropic dielectric volume is configured to permit the first electric field and the second electric field to propagate within the anisotropic dielectric volume from the antenna at least partially toward the first conductive structure and to radiate from the first surface to the exterior.

2. The electronic device of claim 1, wherein the anisotropic dielectric volume further comprises a plurality of ground strips aligned with the antenna plane, wherein the ground strips divide the anisotropic dielectric volume into a first dielectric volume extending between a first surface of the dielectric volume and the ground strips and a second dielectric volume extending between the ground strips and the second conductive structure.

3. The electronic device of claim 2, wherein the first dielectric volume and the second dielectric volume are shaped differently such that the anisotropic dielectric volume is asymmetric.

4. The electronic device of claim 2, wherein the ground strips define a conductive pattern extending from the antenna toward the first conductive structure.

5. The electronic device of claim 4, wherein the conductive pattern comprises at least one of lines, tracks, or traces in alignment with the antenna plane.

6. The electronic device of claim 5, wherein the conductive pattern further comprises at least two lines, tracks, or traces separated by a capacitive gap.

7. The electronic device of claim 2, wherein the first electric field has a horizontal polarization and extends perpendicular to conductive surfaces of the ground strips in a configuration enabling the first antenna element to utilize the first dielectric volume and the second dielectric volume, and wherein the second electrical field has a vertical polarization and extends parallel with the conductive surfaces of the ground strips in a configuration for exciting currents on the conductive surfaces and enabling the second antenna element to utilize the first dielectric volume only.

8. The electronic device of claim 2, further comprising a substrate securing one of the antenna elements or the ground strips.

9. The electronic device of claim 8, wherein the substrate comprises a printed circuit board.

10. The electronic device of claim 8, wherein the substrate extends at least partially parallel to the display.

11. The electronic device of claim 1, wherein the first antenna element and the second antenna element are end-fire antenna elements, and wherein the anisotropic dielectric volume extends between the antenna and the first conductive structure in a radiation direction of the end-fire antenna elements, and wherein the radiation direction is in alignment with the antenna plane.

12. The electronic device of claim 1, wherein a height (h) of the anisotropic dielectric volume in a direction perpendicular to the antenna plane decreases in a direction from the antenna toward the first conductive structure, in a configuration to confine the first electric field and the second electric field within the anisotropic dielectric volume when $h>\lambda/(2\sqrt{\varepsilon_r})$, wherein $\lambda$ is a wavelength of the first electric field and the second electric field, wherein $\varepsilon_r$ is an effective relative dielectric constant of the anisotropic dielectric volume, and wherein the first electric field and the second electric field are radiated into a space adjacent to the anisotropic dielectric volume and the first conductive structure when $h\leq\lambda/(4\sqrt{\varepsilon_r})$.

13. The electronic device of claim 1, wherein center lines of the first antenna element and the second antenna element are in alignment with an edge of the first conductive structure.

14. The electronic device of claim 1, wherein the anisotropic dielectric volume further comprises a plurality of conductors coupling the anisotropic dielectric volume with the antenna, wherein the conductors extend at least partially in parallel with the antenna plane and at least partially parallel with the radiation direction.

15. The electronic device of claim 1, wherein the anisotropic dielectric volume further comprises a plurality of conductors coupling the anisotropic dielectric volume with the antenna, wherein the conductors extend parallel with the antenna plane and perpendicular to the radiation direction.

16. The electronic device of claim 1, further comprising a gap between the antenna elements, the frame and the display, wherein the gap accommodates the anisotropic dielectric volume, wherein the antenna system is adjacent to the back cover, wherein the first surface of the anisotropic dielectric volume extends adjacent to the back cover, and wherein the first conductive structure and the second conductive structure are located between the first surface and the back cover.

17. The electronic device of claim 16, wherein the electronic device comprises a second antenna system at least partially located in the gap.

18. The electronic device of claim 17, wherein the second antenna system comprises a sub-6 gigahertz (GHz) antenna.

19. The electronic device of claim 1, further comprising a discontinuity between the back cover and the frame, and extending between the first conductive structure and the second conductive structure and along the first surface of the anisotropic dielectric volume, wherein the discontinuity permits the first electric field and the second electric field to radiate externally from the antenna system.

20. The electronic device of claim 1, wherein a height of the anisotropic dielectric volume extends from the back cover to the display.

* * * * *